E. M. HESSELBOM.
Stalk-Cutters.

No. 148,058. Patented March 3, 1874.

Witnesses;
Sydney Brooks
Z. P. Dederick

Inventor
Trix. M. Hesselbom
per Z. P. Dederick.
Atty.

UNITED STATES PATENT OFFICE.

ERIX M. HESSELBOM, OF ILLAWARA, LOUISIANA.

IMPROVEMENT IN STALK-CUTTERS.

Specification forming part of Letters Patent No. 148,058, dated March 3, 1874; application filed August 20, 1873.

*To all whom it may concern:*

Figure 1:
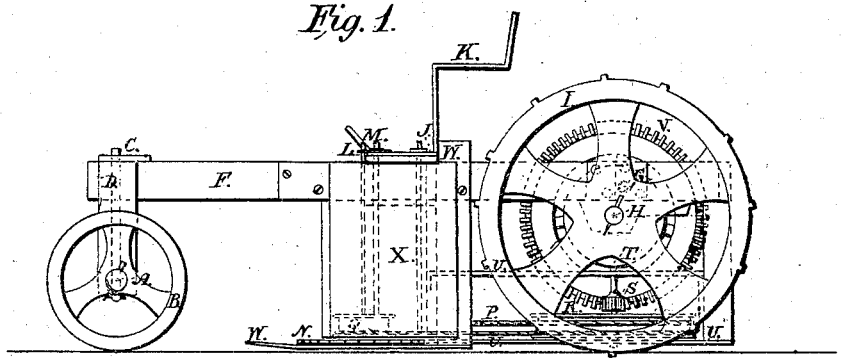
Figure 2:
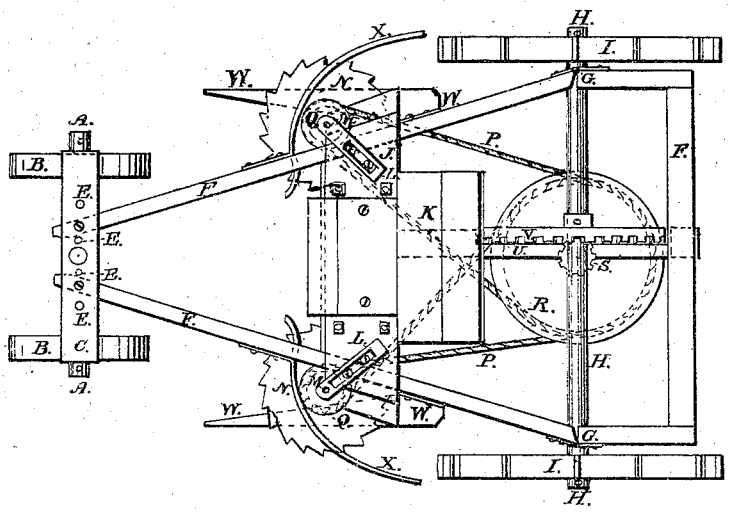

Be it known that I, E. M. HESSELBOM, of Illawara, in the parish of Carroll and State of Louisiana, have invented a new and useful Improvement in Stalk-Cutters, of which the following is a specification:

Figure 1 is a side elevation of my improved stalk-cutter; and Fig. 2, a top view of the same.

Similar letters of reference indicate corresponding parts.

My invention has for its object to furnish an improved stalk-cutter, simple in construction, inexpensive in manufacture, convenient in use, effective in operation, and easily adjusted and controlled; and it consists in the construction and combination of various parts, as hereinafter more fully described.

A is the front axle, to which the tongues or shaves to which the power is applied are attached. Turning upon each end of this axle are wheels B B, which support the front end of the machine. The cap C, resting upon the bolster D that is pivoted to the front axle, is cut away, as indicated by the dotted lines, and it is also provided with holes E, for the purpose of widening or narrowing the front part of the main frame F, for the purpose of adjusting the cutters for any width of rows. The frame F is hinged at G, the rear end of which rests upon an axle, H, to each end of which are rigidly secured the main drive-wheels I I. To the two parallel bars J, extending across and secured to the frame F, the driver's seat K is attached, and also the plates L L. Said plates are provided with slots, and are secured to the cross-bar by bolts passing through said slots. These plates form bearings for the vertical saw-shafts M. To the bottom ends of these shafts the circular saws N N are secured, in the usual manner, and they are driven by bands P passing around the wheels Q Q and R. The wheel R and bevel-pinion S are secured to the vertical shaft T that turns in bearings formed in the parallel bars U. This pinion receives motion from a bevel-wheel, V, that is secured to the main drive-wheel shaft.

The stalks to be cut pass upon the inside of the guards W, by which they are held from swaying laterally when they come in contact with the saws.

The guards X are to throw the stalks over from the machine after being cut.

Having thus described my invention, I claim as new and desire to secure by Letters Patent—

In combination with a rotary stalk-cutter, the guards W W and X X, as and for the purpose described.

ERIX M. HESSELBOM.

Witnesses:
  SYDNEY BROOKS,
  Z. P. DEDERICK.